March 26, 1968

H. P. ABBOTT 3,374,547

CASE MEASURING DEVICE

Filed June 6, 1966

INVENTOR.
HORACE P. ABBOTT

BY his ATTORNEYS.

March 26, 1968  H. P. ABBOTT  3,374,547
CASE MEASURING DEVICE
Filed June 6, 1966  2 Sheets-Sheet 2

INVENTOR.
HORACE P. ABBOTT
BY
his ATTORNEYS.

United States Patent Office 3,374,547
Patented Mar. 26, 1968

3,374,547
CASE MEASURING DEVICE
Horace P. Abbott, Old Greenwich, Conn., assignor to Lever Brothers Company, New York, N.Y., a corporation of Maine
Filed June 6, 1966, Ser. No. 555,454
7 Claims. (Cl. 33—143)

ABSTRACT OF THE DISCLOSURE

Case measuring device in which a knob drives through torque-limiting mechanism a shaft driving a pair of spaced pinions each meshing with a pair of racks to drive them in opposite directions. The racks meshed with each pinion are each coupled to a respective one of two spaced plates each supported by two spaced racks at locations near the plate perimeter. The knob driving action is converted into a plate separation movement arrested by engagement of the plates with opposite inner sides of a case, the greatest realized separation being indicated by a measuring scale.

---

This invention relates in general to case measuring devices and more particularly to a measuring device for obtaining accurate measurements of the internal dimensions of a case and a readily visible indication of the dimensions of the case.

The accurate determination of the size of large containers or packing cases has long been a problem in the packaging and measuring art as evidenced by the fact that measurements taken on different occasions by the same or different individuals often produce completely random results.

In the prior art measuring devices, the measuring contactors or other members which are pressed against the case walls to make a measurement are supported by a single, centrally disposed telescoping rod arrangement with the result that, if the contactors extend laterally for any substantial distance, their outer surfaces may deflect slightly and in this position produce inaccurate results. If, on the other hand, the contactors or their equivalent are small in area, the spacing between the points of contact with the case walls may not be representative. Furthermore, a narrow measuring surface may cause a deflection of the case walls being measured, or the measuring device may be tilted giving an incorrect measurement.

In many prior art devices the means for adjusting the contactors and providing an indication of the measurement has been located in a position adjacent the axis of motion of the contactors, forcing the instrument operator to reach deep within the container being measured to separate the contactors and obtain a reading. The awkwardness of this procedure appears to be at least one cause of the random results often produced by some prior devices. The invention disclosed herein overcomes these disadvantages.

More particularly, the invention described herein overcomes the disadvantage of the prior devices by including large measuring plates as contactors and ensuring substantial engagement with the internal surfaces of the carton being measured rather than the mere engagement of a single point on each of the opposed internal surfaces. These large measuring plates, in turn, are supported at at least two positions adjacent their outer extremities so as to ensure that they will not deflect during the measurement operation and produce an inaccurate reading.

In addition, the linear motion of the oppositely moving measuring plates is provided by a double set of racks and pinions which, in turn, are driven by the rotation of a centrally positioned control rod which extends beyond the outer extremities of the measuring plates in a direction perpendicular to the axis defining the movement of the measuring plates.

Furthermore, this invention employs a clicker mechanism which helps obtain a uniform measurement by ensuring that the pressure of the measuring plates against the internal surfaces of the carton or case being measured will always be the same at the final reading. This torque control is achieved by placing a resilient control means or spring between the centrally positioned control shaft and the outer knob actuated by the operator. Thus, if the torque which is necessary to turn the control rod exceeds a certain predetermined magnitude, the resilient means will yield and disconnect the knob rotated by the operator from the centrally disposed control rod. Thus, above a specific torque magnitude, the knob will merely rotate without transferring further movement to the measuring plates and without causing a disproportional deflection of the case on successive measurements.

Other objects and a fuller understanding of the invention may be had by referring to the following description and claims, taken in conjunction with the accompanying drawing, in which:

Figure 1:
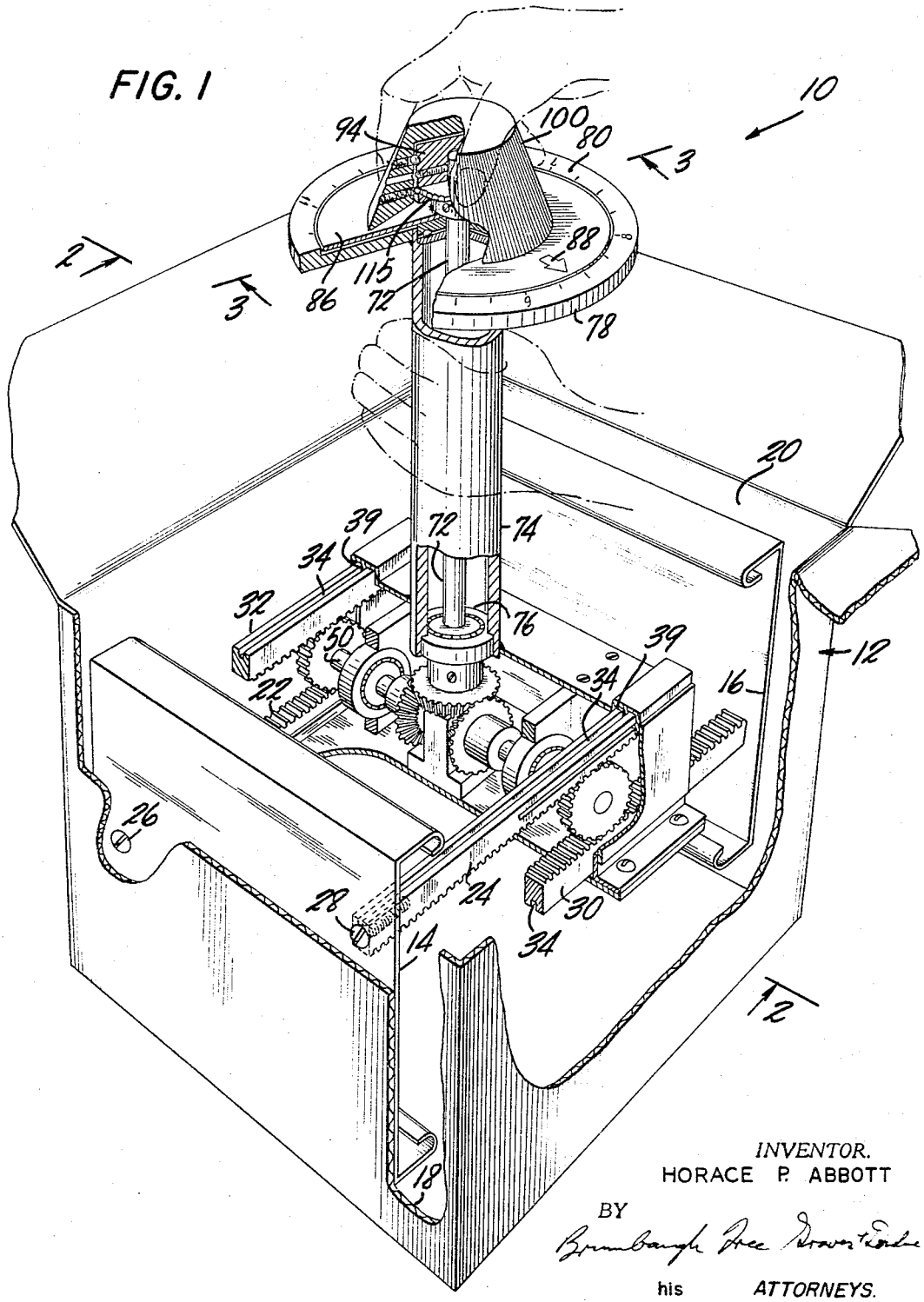
FIGURE 1 shows a partially cross-sectioned perspective view of a case measuring device incorporating this invention.

With reference to the drawing, the invention is illustrated as being incorporated in a case measuring device indicated generally by the reference character 10. As illustrated measuring device 10 is composed of two wide, flat and parallel plates 14 and 16 which are movable linearly toward or away from each other in a direction perpendicular to the plane of both plates 14 and 16.

The case measuring device 10 is shown in FIG. 1 within a box 12 having two spaced opposite internal surfaces 18 and 20. In FIG. 1 the plate 14 has been moved to a position adjacent internal surface 18 by a pair of racks 22 and 24 which are fastened to plate 14 by fasteners 26 and 28 respectively. Similarly, plate 16 is shown in a position adjacent internal surface 20 of box 12 and is movably supported by a pair of racks 30 and 32 which are similarly fastened to the internal surface of plate 16.

Racks 32 and 24 both have a groove 34 extending across their upper surfaces which is designed to engage the guides 39 on the lower surface of upper supporting plate 38. Similarly, the racks 22 and 30 both have a groove 33 on their lower surfaces which is designed to engage the guides 41 (FIG. 2) on the upper surface of lower supporting element 40.

The upper supporting element 38 and the lower supporting element 40, together with side elements 42 and 44, encase the racks 22, 24, 30 and 32 and limit their movement to a lineal motion in the same axial direction, that is in a direction perpendicular to the parallel plates 14 and 16.

Rack 22 has (FIG. 2) a groove 43 on its side surface within which a guide 45 is slidably positioned. Similarly rack 32 has a groove 47 on its side surface which is positioned for slidably receiving guide 49. These guides 45 and 49 in combination with the grooves 43 and 47 respectively, may be designed so as to define the limits of linear movement of racks 22 and 32 and thus control the limiting positions of plates 14 and 16 and of racks 24 and 30 which are attached to them.

Figure 2:
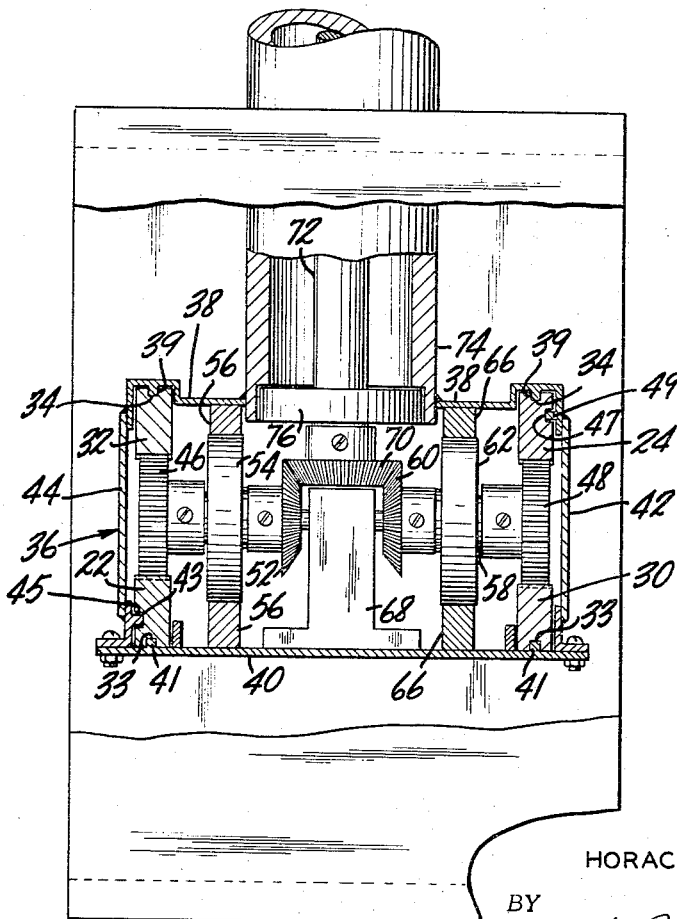
FIGURE 2 is a cross-sectioned elevational view of the lower plate driving portion of the case measuring device shown in FIGURE 1 taken along the lines 2—2.

Racks 32 and 22 are driven by pinion gear 46 which, as shown in FIG. 2, is positioned between them and which is mounted on shaft 50. Shaft 50, in turn, is supported by bearing 54 which is held in place by supporting element 56 which bridges the upper supporting surface 38 and lower supporting surface 40.

A central support 68 is fastened onto the lower supporting surface midway between the racks 22 and 32 and the racks 24 and 30. This central support 68 is grooved so as to rotatably support the end of shaft 50 which is opposite to the end fastened to pinion 46. Adjacent to central support 68 and mounted on shaft 50 is driven bevel gear 52.

Similarly, the opposite racks 24 and 30 are driven by pinion 48 which is positioned between them. Pinion 48 is attached to shaft 58 which is supported by bearing 62 which, in turn, is fastened to supporting wall 66 between upper surface 38 and lower surface 40. The end of shaft 58 which is opposite pinion 48, is supported in central support 68 and a driven bevel gear 60 is attached to shaft 58 adjacent this end.

Figure 3:
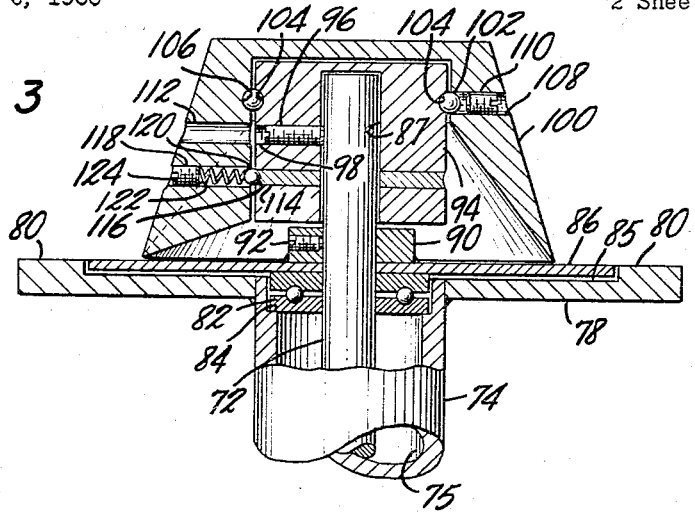
FIGURE 3 is a cross-sectioned elevational view of the upper control portion of the case measuring device shown in FIGURE 1 taken along the lines 3—3.

Both bevel gear 52 and bevel gear 60 mesh with the driving bevel gear 70 which is fastened at the lower end of a centrally disposed rotatable vertical shaft 72. This vertical shaft 72 is positioned within the hollow center of tubular conduit 74 and is held in place above central support 68 by thrust bearing 76 which is attached to the lower end of the tubular conduit 74. The lower end of tubular conduit 74 is, in turn, fastened to and supported by the upper supporting surface 38 and its upper end is firmly attached to circular plate 78 (FIG. 3).

The upper surface of the circular plate 78 has an annular recess 85 suitable for receiving a slightly smaller indicator dial 86. The upper surface of circular plate 78 also contains a circumferential scale 80 (FIG. 1) positioned adjacent to but spaced from the outer circumference of the indicator dial 86 and the indicator arrow 88.

Vertical shaft 72 is rotatably supported (FIG. 3) in countersink 84 within the hollow center of conduit 74 by being fixedly secured to the upper bearing plate of the shown bearing assembly 82. In addition, the shaft 72 is firmly attached to the indicator dial 86 and its flange mounting element 90 by set screw 92. Above the indicator dial 86, the vertical shaft 72 enters recess 87 in hub 94 and is locked in this position by fastening element 96 which is movable transversely in threaded recess 98.

The hub knob 100 is rotatably mounted on and fastened to hub 94 by a plurality of ball bearings 102 which are free to roll in a channel formed by a semi-circular groove 106 on the inner surface of hub knob 100 and an oppositely positioned semi-circular groove 104 on the outer surface of hub 94. The bearings 102 are introduced into this circular channel formed by semi-circular surfaces 106 and 104 through a port 108 in hub knob 100 and are locked therein by port sealing element 110.

In addition, hub knob 100 has a second port 112 which may be rotated to a position opposite the threaded recess 98 thereby providing access to the fastening element 96.

Furthermore, knob hub 100 has a third aperture at the level opposite clicker plate 114 which is firmly attached to hub 94. The clicker plate 114 is in a horizontal position and, has a plurality of semi-circular clicker notches 115 (FIG. 1) spaced angularly around its outer circumference. The grooves 115 are designed to receive (FIG. 3) a spherical element or ball 116 which is introduced through, and partially protrudes from, channel 118 in the hub knob 100. The spherical element 116 is held in place against the semi-circular grooves 115 in clicker plate 114 by a resilient element 122 which is positioned within channel 118 by locking plug 124 threadedly received in the outward end of channel 118. The resilient element 122 in the preferred embodiment is a compression spring which reacts against the inner surface of the locking element 124 and forces spherical element 116 into engagement with the semi-circular notches 115 of clicker plate 114.

The operation of the case measuring device is best illustrated in FIG. 1, where the operator, as shown in phantom, has placed the instrument within the box or case 12 and is in the process of rotating the knob hub 100 in a clockwise direction. The torque applied to the knob 100 is transferred to the hub 94 through the sidewalls of channel 118 bearing against the spherical element 116, which, in turn, is locked in engagement in one of the plurality of semi-circular notches 115 by the compression spring 122.

Thus, by rotating the knob 100, the inner vertical shaft 72 is also rotated in a clockwise direction as viewed from above. This rotation of shaft 72 is transferred through driving bevel gear 70 and driven bevel gear 60 to pinion 48 which rotates in a counterclockwise direction when viewed from the internal side as shown in FIG. 1. This results in the rack 24 moving toward inner surface 18 and rack 30 moving toward inner surface 20 of box 12.

On the other hand, the clockwise rotation of driving gear 70 develops a clockwise rotation of bevel gear 52 and pinion 46 as viewed in FIG. 1, thereby causing rack 22 to move toward inner surface 18 and rack 32 to move toward inner surface 20 of box 12. Thus, the clockwise rotation of knob 100 causes parallel plates 14 and 16 to separate and move toward the inner surfaces of the box 12.

When the plate 14 engages inner surface 18 and plate 16 engages inner surface 20, the further rotation of driving shaft 72 will be resisted by the structure of the casing 12. Thus, a further increase in torque applied to the knob 100 and transferred to the sides of channel 118 and the spherical element 120 will be resisted by the semi-circular notch 115 of clicker plate 114 in which ball 120 is then seated. If this additional torque is still applied to knob 100, the spherical element 120 will be forced to move inwardly within channel 118 by the last named semi-circular notch 115, thereby compressing resilient element 122 until the spherical element 120 moves to the next semi-circular notch 115 in the clicker plate 114. Thus, at this point, the resistance of the case to the expansion of the plates 14 and 16 increases the torque required to turn the actuator knob 100 and, when this torque reaches a fixed predetermined magnitude, the clicker mechanism spring 120 yields, thereby freeing actuator knob 100. The knob 100, thereafter, merely rotates around the clicker plate 115 and the actuator knob hub 94 without transmitting further rotational motion to the hub 94 and the vertical shaft 72. Since the actuator knob hub 94 is attached to the indicator dial 86 which, in turn, is calibrated with the scale on the measuring surface 80, the final position of hub 94 gives a precise and standard measurement for the internal dimension of the case, i.e., in FIG. 1, the dimension between internal surfaces 18 and 20.

The case measuring device described herein overcomes the problem of keeping the measurement of the size of the cases uniform and correct even when the measurements are taken by different individuals or even the same individual on different occasions. The broad parallel plates which are supported by two widely separated movable racks in this device, insure engagement with the closest portions of the internal surfaces of the carton rather than mere contact with a single point on each surface which may not prove to be representative of the exact position of the entire internal walls. In addition, in the case measuring device described herein, each measuring plate is moved into position and supported by doubly driven movable means each of which are substantially adjacent the outer extremities of the measuring plates. Thus, this device insures that the measuring plates themselves will not deflect during the measurement operation and thereby yield an inaccurate reading. In many prior art devices, the measuring plates are supported by a single centrally positioned, telescoping rod arrangement.

With such an arrangement however, it is possible that, if the measuring plates are large, the outer surface of the measuring plate may deflect with respect to the centrally positioned measuring rod, especially in the case of lightweight hand units where limiting the weight of the plates is important.

In addition, the centrally positioned control rod 72 in this invention is located beyond the outer extremities of the measuring plates, which fact eases the task of the instrument operator when he attempts to separate the plates. In many prior art devices, the means for separating the plates is located between the plates, thus forcing the instrument operator to reach deep within the container being measured when attempting to separate the plates and increasing the probability of producing random results when two measurements of the same carton are attempted.

Finally, of course, the clicker mechanism provides an additional means for insuring uniform measurement since the pressure of the plates against the internal surfaces of the carton or case being measured, will at all times be the same. This removes the possibility that the internal surfaces of the carton being measured, will be measured under various torques and in various deflected positions.

Although this invention has been described with a certain degree of particularity, it is to be understood that the present disclosure has been made only by way of example and that numerous changes in the details of construction and the combination and arrangement of parts may be resorted to without departing from the spirit and scope of the invention as hereinafter claimed.

I claim:

1. A case measuring device comprising: first and second wide spaced parallel plates each normal to an axis of linear plate movement passing centrally through each plate, a pair of drivable plate displacing means disposed between said plates and spaced from said axis on transversely opposite sides thereof, a pair of first plate moving members spaced from and on said opposite sides of said axis and coupled to said first plate at locations on the inside thereof which are spaced from the intersection of such plate and axis and are each nearer to the perimeter of said plate than to such intersection, a pair of second plate moving members spaced from and on said opposite sides of said axis and coupled to said second plate at locations on the inside thereof which are spaced from the intersection of said second plate and axis and are each nearer the perimeter of said second plate than the latter intersection, each of said two displacing means being coupled to the first and second members on the same side of said axis as such means so as to drive those two members parallel to said line and oppositely outwards from such displacing means, control means disposed centrally between said plates and coupled to each of said two displacing means to drive them equally to thereby cause such two means and said members to impart to said plates a relative separating movement having said axis as the axis of such movement, said control means extending in a direction parallel to said plates to a point beyond the perimeters of said plates, and means attached to the extended portion of said control means and operable to indicate the amount of separation of said plates.

2. A case measuring device as defined in claim 1 wherein said first and second members for moving the plates comprise first racks and second racks and wherein said pair of displacing means is comprised of two separate coordinated pinions, one rack driven by each pinion being attached to each plate at spaced locations substantially adjacent the perimeter of said plate thereby preventing the deflection of each plate when it engages an internal wall of the case being measured.

3. A case measuring device as defined in claim 2 wherein said centrally disposed control means comprises
a hollow casing surrounding said racks and pinions for defining said axis of linear movement,
a hollow tube leading to said hollow casing, and
a control shaft rotatably supported within said hollow tube for driving the spaced pinions thereby moving said racks and the plates attached to said racks at their outer ends.

4. A case measuring device as defined in claim 3 wherein said control shaft is attached to said spaced pinions through a set of bevel gears whereby the rotational movement of the centrally positioned control shaft is transferred into the linear motion of the spaced racks.

5. A case measuring device as defined in claim 1 wherein said centrally disposed control means comprises
a hollow casing surrounding said plate moving members and said pair of plate displacing means for defining said axis of linear movement,
a hollow tube leading to said hollow casing, and
a control shaft rotatably supported within said hollow tube for driving said two plate displacing means.

6. A case measuring device as defined in claim 1 wherein said means for recording the movement of said plates comprises
a torque control knob,
a movable force transfer element for transferring the rotational force applied to said knob to said control means,
a resilient means located in said control knob which holds said force transfer element in engagement with said control means, said resilient means yielding and permitting the disengagement of said force transfer element from said control means when the torque required to rotate said control means exceeds a predetermined value thereby assuring that the plates of the case measuring device engage the internal walls of the case being measured at the same pressure.

7. A case measuring device as defined in claim 5 wherein said means for recording the amount of separation of said plates comprises
a torque control knob,
a movable force transfer element for transferring the rotational force applied to said knob to said control shaft,
a resilient means located in said control knob which holds said force transfer element in engagement with said control shaft, said resilient means yielding and permitting the disengagement of said force transfer element from said control shaft when the torque required to rotate said shaft exceeds a predetermined value thereby assuring that the plates of the case measuring device engage the internal walls of the case being measured at the same pressure.

References Cited

UNITED STATES PATENTS

| | | | |
|---|---|---|---|
| 756,461 | 4/1904 | Borduas | 33—164 |
| 1,655,133 | 1/1928 | Clase | 33—164 |
| 2,674,047 | 4/1954 | Golner | 33—178 |
| 2,826,820 | 3/1958 | Zelnick | 33—164 X |
| 2,979,826 | 4/1961 | Zabler et al. | 33—164 |
| 3,316,650 | 5/1967 | Aldeborgh et al. | 33—178 |
| 3,319,342 | 5/1967 | Cho | 33—178 |

SAMUEL S. MATTHEWS, *Primary Examiner.*